(12) United States Patent
Satish (10) Patent No.: US 11,265,206 B1
(45) Date of Patent: Mar. 1, 2022

(54) DYNAMIC UPDATES OF INCIDENT STATUS INFORMATION

(71) Applicant: Splunk Inc., San Francisco, CA (US)

(72) Inventor: Sourabh Satish, Fremont, CA (US)

(73) Assignee: Splunk Inc., San Francisco, CA (US)

( * ) Notice: Subject to any disclaimer, the term of this patent is extended or adjusted under 35 U.S.C. 154(b) by 72 days.

(21) Appl. No.: 16/051,106

(22) Filed: Jul. 31, 2018

(51) Int. Cl.
  *H04L 12/24* (2006.01)
  *H04L 29/06* (2006.01)
  *G06F 16/34* (2019.01)
  *H04L 41/0631* (2022.01)
  *H04L 41/14* (2022.01)
  *H04L 41/22* (2022.01)

(52) U.S. Cl.
  CPC .......... *H04L 41/065* (2013.01); *G06F 16/345* (2019.01); *H04L 41/14* (2013.01); *H04L 41/22* (2013.01); *H04L 63/20* (2013.01)

(58) Field of Classification Search
  CPC ....... H04L 41/065; H04L 41/22; H04L 63/20; H04L 41/14; G06F 16/345
  See application file for complete search history.

(56) References Cited

U.S. PATENT DOCUMENTS

| | | | | |
|---|---|---|---|---|
| 2016/0255105 | A1* | 9/2016 | Palazzo | H04L 63/1416 726/23 |
| 2017/0366582 | A1* | 12/2017 | Kothekar | H04L 63/205 |
| 2018/0004948 | A1* | 1/2018 | Martin | G06F 21/566 |
| 2018/0103058 | A1* | 4/2018 | St. Pierre | H04L 63/1433 |
| 2018/0262524 | A1* | 9/2018 | Deshpande | H04L 63/1433 |
| 2018/0367561 | A1* | 12/2018 | Givental | H04L 63/1433 |
| 2019/0108470 | A1* | 4/2019 | Jain | G06Q 10/20 |
| 2020/0012990 | A1* | 1/2020 | Bhargava | G06Q 10/063112 |

* cited by examiner

*Primary Examiner* — Austin J Moreau
(74) *Attorney, Agent, or Firm* — Nicholson De Vos Webster & Elliott LLP (57) ABSTRACT

Described herein are systems, methods, and software to enhance the management of responses to incidents in an information technology (IT) environment. In one example, a management system identifies an incident in an IT environment, identifies an initial status for the incident for an analyst of the IT environment, and provides the initial status for display to the analyst. The management system further monitors state information for the incident in the IT environment, identifies a second status of the incident based on the monitored state, and provides the second status for display to the analyst.

30 Claims, 9 Drawing Sheets

DYNAMIC UPDATES OF INCIDENT STATUS INFORMATION

TECHNICAL BACKGROUND

An increasing number of data security threats exist in the modern computerized society. These incidents may include viruses or other malware that attack a local computer of an end user, or sophisticated cyber-attacks to gather data from or otherwise infiltrate a complex information technology (IT) environment. Such IT environments include real and virtual computing devices executing various applications used to provide a variety of services, such as data routing and storage, cloud processing, web sites and services, amongst other possible services. To protect applications and services, various antivirus, encryption, and firewall tools may be used across an array of computing devices and operating systems, such as Linux® and Microsoft Windows®.

IT environments may employ a variety of computing components with different hardware and software configurations to provide the desired operation. These computing components may include end user computing devices, host computing devices, virtual machines, switches, routers, and the like. However, as more computing components are added to an IT environment, those same components become available as targets of potential security incidents or sources of operational incidents. The increasing number computing components in combination with limited administrative personnel and resources can make it difficult to manage the investigation and remediation of incidents in an IT environment. Even with ample administrators or analyst users, it can be cumbersome to coordinate investigation and remediation efforts.

SUMMARY

The technology described herein enhances the operation of management system in an IT environment. In one implementation, a method of operating a management system includes identifying an incident within the IT environment, and identifying and providing an initial status for the incident for an analyst of the IT environment. The method further includes monitoring state information for the incident in the IT environment, identifying a second status of the incident based on the monitored state information, and providing the second status to the analyst.

DETAILED DESCRIPTION

Figure 1:
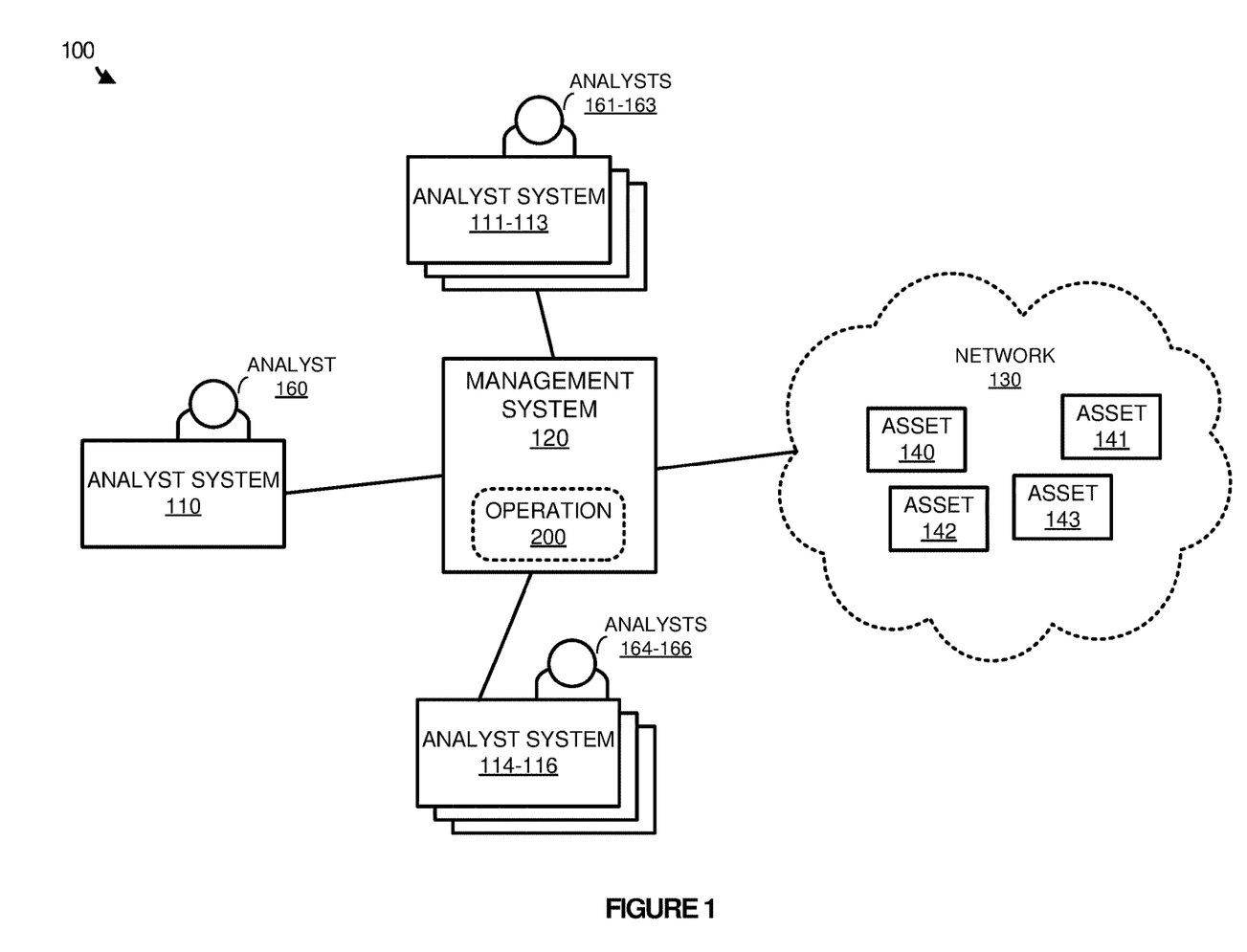
FIG. 1 illustrates an IT environment to provide incident information to an analyst according to an example.

FIG. 1 illustrates an example IT environment 100. In various embodiments, IT environment 100 can include analyst systems 110-116, incident management system 120, and network 130. Network 130 can include computing assets 140-143, wherein the assets may comprise any combination of physical computing systems (e.g. personal computing systems, host computing systems, and the like), virtual computing systems (e.g. virtual machines or containers), routers, switches, or other similar computing assets. Analyst systems 110-116 can be associated with analysts 160-166, wherein the analysts may provide management, trouble shooting, or security operations on assets within network 130. Although illustrated as being separate from network 130, analyst systems 110-116 or management system 120 may operate as part of network 130 in some examples. Management system 120 is communicatively coupled with analyst systems 110-116 and network 130 and can include functionality to provide execute various operations, such as operation 200 described in FIG. 2.

In operation, assets 140-143 function in network 130 to provide various services and functionality. The services and functionality may include operations for performing as an end user computing system, a server computing system, a host for one or more virtual machines, a virtual machine itself, a switch, a router, or some other similar operation in the IT environment. During the operation of the computing assets, the assets may encounter incidents that can subject the network to the loss of data, interruption in services, or some other similar incident. These incidents may include or be associated with viruses, malware, spyware, denial of service attacks, phishing attacks, server crashes, device failures, power outages, or other similar incidents. In response to an incident, analysts 160-166 may be notified by a report of the incident, investigate the incident, and initiate one or more response actions to mitigate, monitor, remove, or provide any other similar operations to remediate or correct the incident.

In some implementations, to identify incidents, network 130 may employ security information and event management (SIEM) services or other analysis and monitoring systems that are used to automate the identification of incidents within the environment. For example, if an unknown process were operating on asset 140, a SIEM service may identify the incident and be used to provide information about the incident to management system 120. This information may include information about the name of the unknown process, the source of the process, any credential or licensing information for the software, or some other similar information about the process. In some examples, in addition to or in place of the automated identification of incidents within an IT environment, network 130 may employ a "ticket" system, wherein users and analysts of the environment may report incidents. As an example, when an email is received from an unknown party looking for personal information from an employee of the organization, the employee may report the email as an incident. Once reported to management system 120, management system 120 may use the information to identify the type of incident presented, as well as information about the source of the email.

After an incident is identified, management system 120 may determine how to respond to the incident. In particular, management system 120 may provide status information about the incident to one or more analysts of analysts 160-166 and assist in implementing actions to address the particular incident. The information provided to the analysts may include attributes of the incident (IP addresses, process names, affected users or devices, and the like), supplementary information about the incident derived from websites and databases, and may further include suggested actions to be taken against the incident, wherein the suggestions may be based on the type of incident, the assets involved in the incident, the severity level of the incident, and the like. In the present implementation, management system 120 may update the status information that is provided to an analyst over time, permitting the analyst to more accurately identify a current state of the incident.

Figure 2:
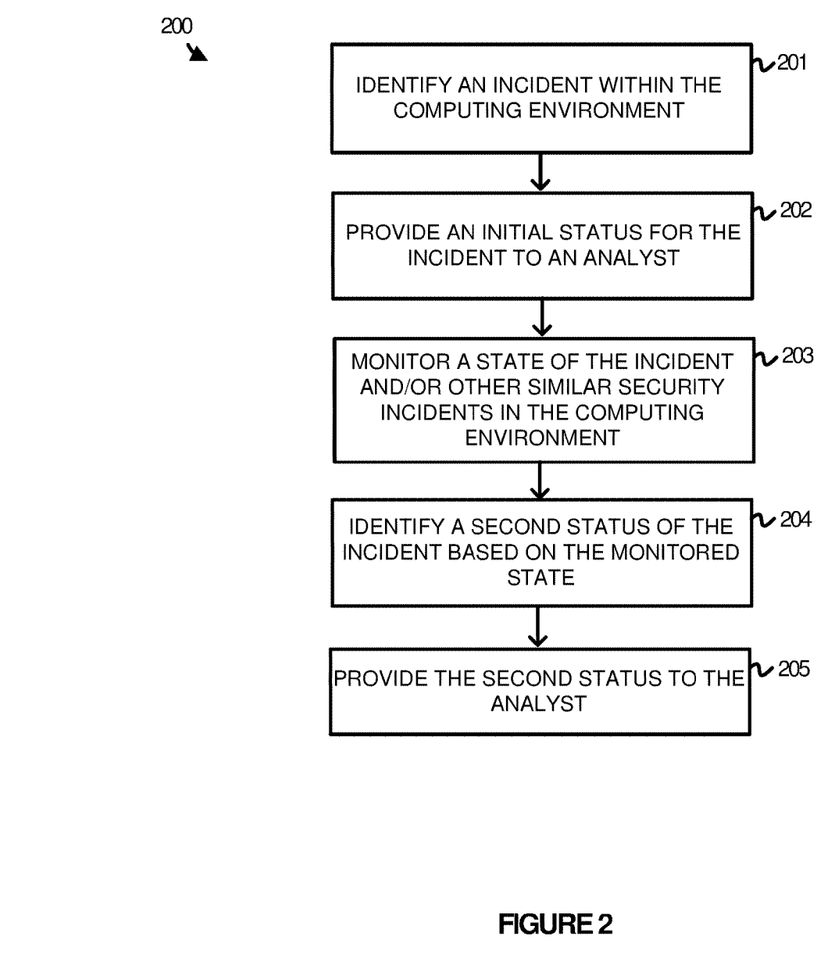
FIG. 2 illustrates an operation of a management system according to an example.

To further demonstrate providing analyst recommendations to a responding analyst, FIG. 2 is provided. FIG. 2 illustrates an operation 200 of a management system according to an example. The processes of operation 200 are described parenthetically with reference to systems and elements of IT environment 100 of FIG. 1.

As depicted, management system 120 identifies (201) an incident within the IT environment. In identifying the incident, management system 120 may use a security monitoring processes on each of the assets, a STEM, a security ticket process for users in the IT environment, or some other similar operation to identify an incident within the IT environment. Once an incident is identified, operation 200 provides (202) an initial status for the incident to an analyst of analysts 160-166. In selecting the analyst to respond to the incident, management system 120 may identify an analyst who is associated with an asset involved in an incident, an analyst who shows availability to respond to the incident, an analyst associated with the type of incident, or some other similar selection process. Additionally, the initial status of the incident may include a variety of information for the incident. This information may include attributes associated with the incident (associated asset name, source/destination IP addresses for the incident, process names, communication attributes, and the like), supplementary information that is gathered from one or more supplementary sources (e.g. websites and databases), and may further include suggested actions to be taken against to address or remediate the incident. For example, if an unknown process were executing on asset 140, management system 120 may determine an identifier or name for asset 140, a name for the unknown process, a source of the unknown process, and the like. Additionally, management system 120 may consult supplemental resources to determine additional information associated with the incident, such as the type of incident that is presented by the process, what information is sought by the incident, a geolocation of an internet protocol (IP) address, or some other similar information associated with the incident. In some implementations, based on the attributes and the supplemental information, management system 120 may further generate suggested actions that can be taken against the incident. These action suggestions may be based on the source of the incident, the type of incident, the type of asset affected by the incident, actions against similar incidents (e.g. actions by analysts on malicious processes), or some other similar factor, including combinations thereof. In some implementations, the actions may be provided as a hierarchy, wherein actions may be promoted based on the factors provided above. As an example, management system 120 may promote an action that was selected by a majority of analysts in responding to similar incidents.

Once the initial status information for the incident is provided to the analyst, management system 120 monitors (203) a state of the incident and/or other similar incidents within the environment. This monitoring of the incidents may include monitoring the operations of the incidents (e.g. whether the incident is in an infiltrate, exfiltrate, etc. state for the environment), the types of data being sought by the incidents, patterns of the incidents, or some other similar state information. Additionally, the state information may also monitor the interactions of the various analysts 161-166 in responding to other similar incidents, such as incidents of the same type. These interactions may include the types of actions employed by the analysts, the results of the actions with the incidents, or some other similar action by other analysts within the environment. While monitoring the state of the incidents within network 130, operation 200 further identifies (204) a second status of the incident based on the monitored state and provides (205) the second status to the responding analyst.

Using an example of analyst 160 responding to an incident within network 130, management system 120 may provide analyst 160 with an initial status of the incident based on attributes identified for the incident, as well as information from other similar incidents. Once the initial information is provided to analyst 160, management system 120 may monitor the status of the incident and other similar incidents within the environment and provide updates to the initial information, permitting analyst 160 to provide a more informed response to the incident. In some implementations, the updated information may provide information about responses implemented by other analysts, information the effectiveness of the responses, as well as which of the analysts are responding to similar incidents. Accordingly, rather than information about a single incident in the environment, analyst 160 may implement responses based on information from other similar incidents and analysts responding to the incidents.

Figure 3A:
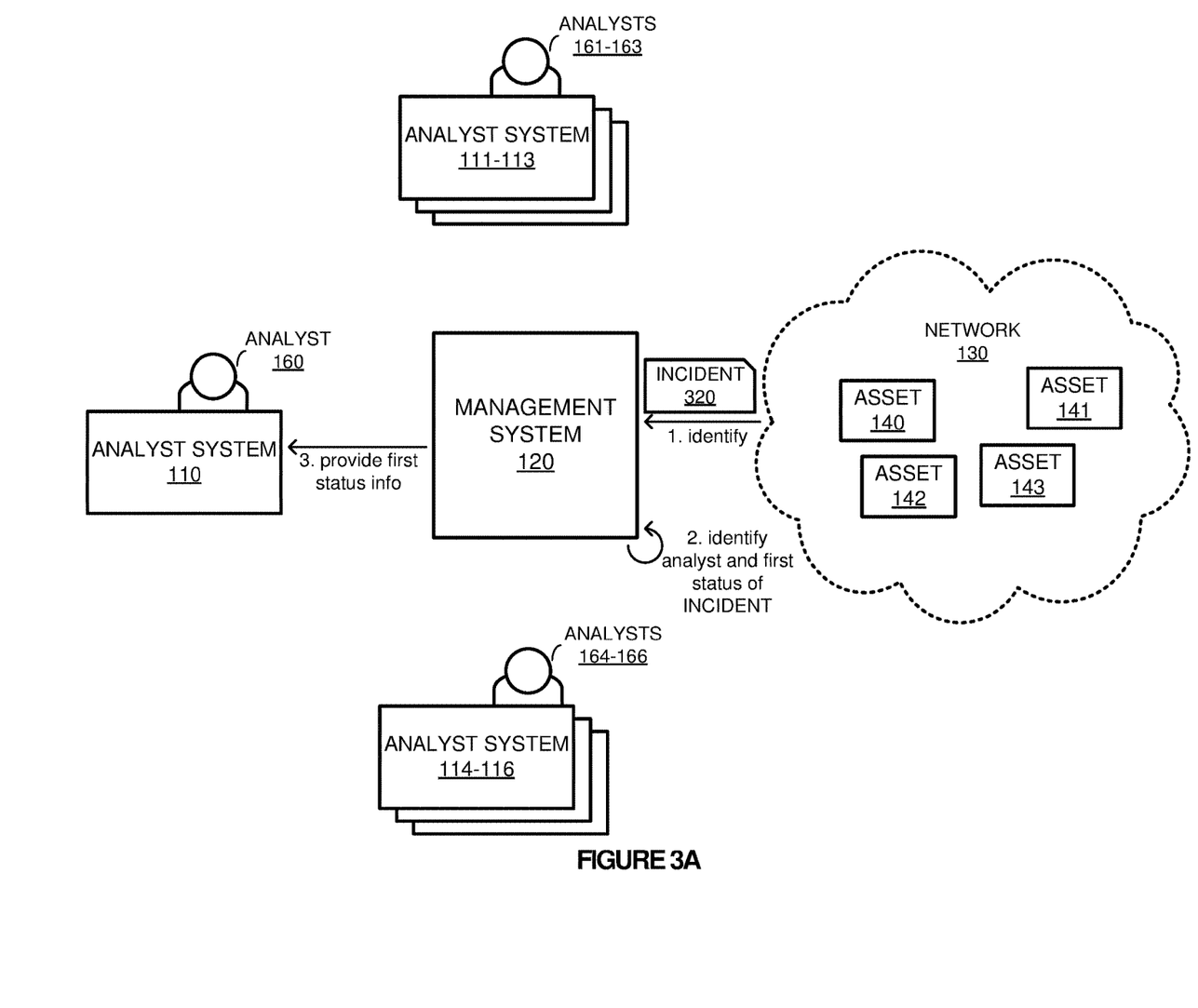
FIGS. 3A-3B illustrate an operational scenario of responding to an incident according to an example.
Figure 3B:
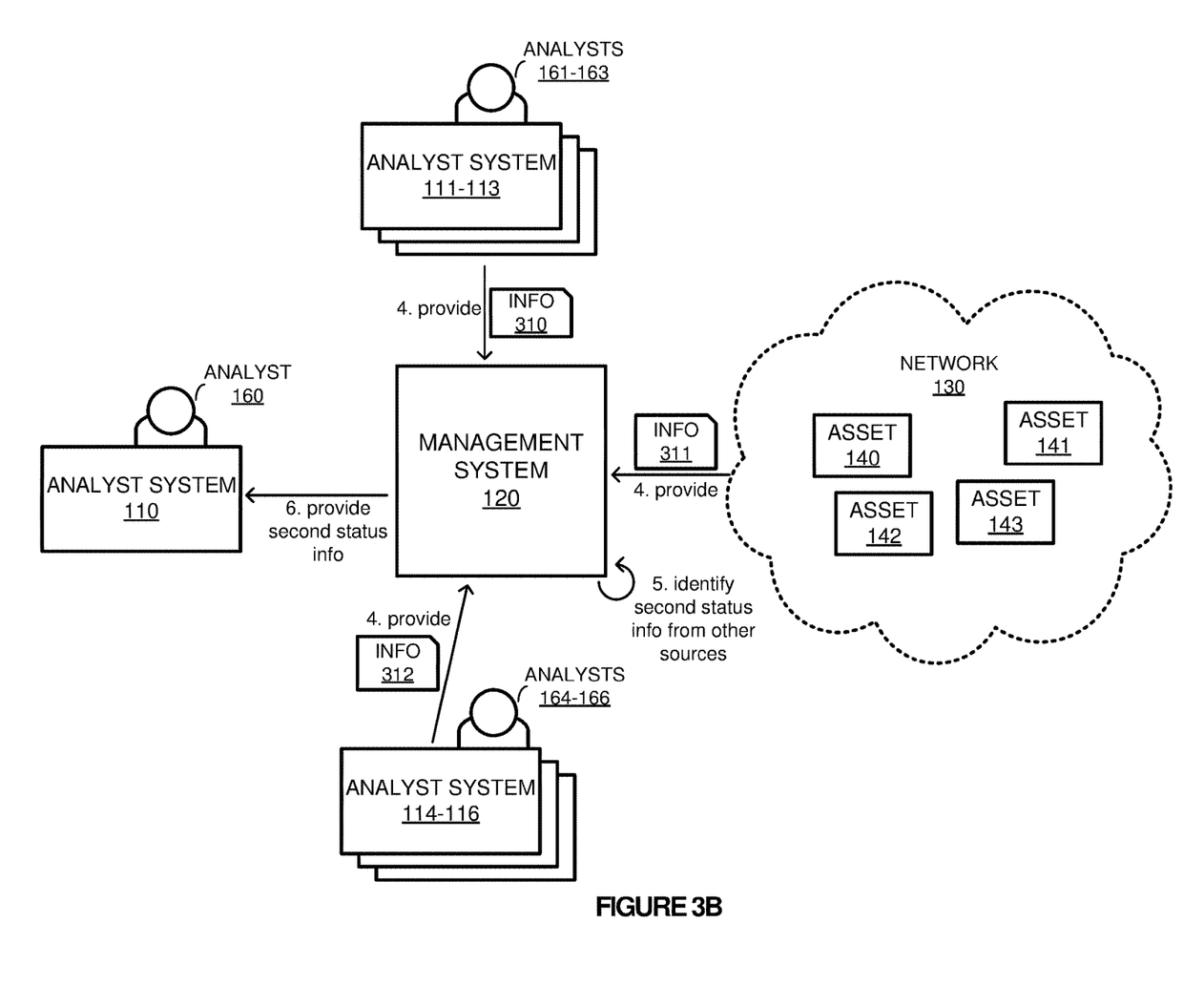

FIGS. 3A-3B illustrate an operational scenario of responding to an incident according to an example. FIGS. 3A-3B include systems and elements of IT environment 100 of FIG. 1.

Referring first to FIG. 3A, management system 120 may monitor for incidents in network 130, wherein the incidents may include phishing attacks, viruses or unknown processes, denial of service attacks, firewall incidents, power outages, device failures or some other similar incident within the IT environment. These incidents may be identified via automated processes, such as a SIEM or may be identified from users in the environment that identify the incident. Once an incident is identified, such as incident 320 at step 1, the incident is processed by management system 120, where management system 120 identifies an analyst and a first status of the incident, at step 2. This first status may be based on information provided when the incident is reported (e.g. IP addresses associated with the incident, developer information for the incident, asset information for the incident, or some other similar information for the incident). Additionally, the first status may be determined based on supplementary information derived from the attributes of the incident, wherein the supplementary information may be obtained from websites and databases, and may be used to identify responses to similar incidents within network 130 (as well as other networks), information about the type of incident presented, information about the type of data sought by the incident, or some other similar information. Once the first status of the incident is identified, the first state information is provided to the selected analyst, in this example analyst 160, at step 3.

In some implementations, in providing the first status information to analyst system 110, management system 120 may be configured to identify action suggestions for analyst 160 based on the attributes of the incident, as well as the supplementary information for the incident. For example, if the incident were identified in asset 140, management system 120 may determine actions to be implemented in asset 140 and/or other assets 141-143. These actions may be determined based on the type of incident identified, the type of asset affected, the criticality of the asset, actions by other analysts on the same or similar incidents, the results of the other actions on the same or similar incidents, or some other similar information. In some implementations, when the action suggestions are provided to the analyst, the actions may be prioritized and/or provided as a hierarchy to the analyst. In particular, various actions for an incident may be allocated a score based on the aforementioned factors and provided to the analyst based on the scores. These actions may be given as a list with actions of higher scores promoted (e.g. higher, in bold or larger font, or some other similar method of promotion) over other actions. In some examples, the score may be used to select only particular actions that meet criteria or exceed a defined threshold. Thus, any action that did not meet the required criteria would not be provided to the analyst, while any action that did meet the criteria would be provided to the analyst. Once the qualified actions are identified, management system may provide the actions to the analyst as described herein. In some examples, as the information is provided to the Examiner, the status information for why each of the action suggestions were presented. This may include information about who implemented the action, the successfulness of the action, the similarity between the current incident and the previous incident, or any other similar information.

Turning to FIG. 3B, after the first status information is provided to analyst 160, management system 120 may monitor a state of the incident and other similar incidents in the IT environment, at step 4. As depicted, management system 120 may obtain information from analysts and from the network to determine how the state of the incident is changing within the environment. In some implementations, information 311 that is obtained from network 130 may include how the incident is operating in the network (e.g. is the incident in an infiltrating, ex-filtrating, exploratory, or other similar state), information about the data available to the incident, a severity rating of the incident, a criticality rating of assets involved in the incident, or any other similar information for the incident. In addition to the information that is provided about the incident itself, management system 120 also receives information from other analysts, wherein the information from other analysts may include types of actions against the same or similar incidents, the successfulness of those actions, or any other similar information for the incident. For example, if incident 320 were an unknown process, management system 120 may identify actions by other analysts against other unknown processes from the same source, of a similar name, or some other similarity to the current unknown process.

Once the information is obtained, management system 120 may identify a second status of the incident based on the monitored state information, a step 5, and may provide the second status to the responding analyst at step 6. Referring to the example in FIG. 3B, management system 120 may provide updated status information to analyst 160 and analyst system 110 based on the information obtained from the analyst systems and the computing network. This information may include updated action suggestions in some examples, wherein the updated suggestions may replace previous suggestions, modify the order of the suggestions, or provide other information regarding the suggestions. In some implementations, management system 120 may provide alerts about how other analysts are responding to the same or similar incidents, wherein the alerts may summarize actions, such as blocking internet protocol addresses, removing a process on a device, setting up virtual local area networks for assets associated with the incident, or some other similar information about each of the actions.

In some implementations, when the second status information is provided to analyst system 110, management system 120 may identify other analysts that may assist the current analyst in responding to the incident. These other analysts may comprise analysts that have recently responded to the same or different incident, analysts that have had success in responding to similar incidents, analysts that are familiar with the type of incident, or some other analyst within the environment. In some examples, when the first status information is provided to analyst 160, the status information may include a first set of suggested analysts to cooperate with analyst 160 in responding to an incident, however, based on information 310-312 that is obtained after the first status information, management system 120 may update the suggested analysts using the factors described above.

Figure 4:
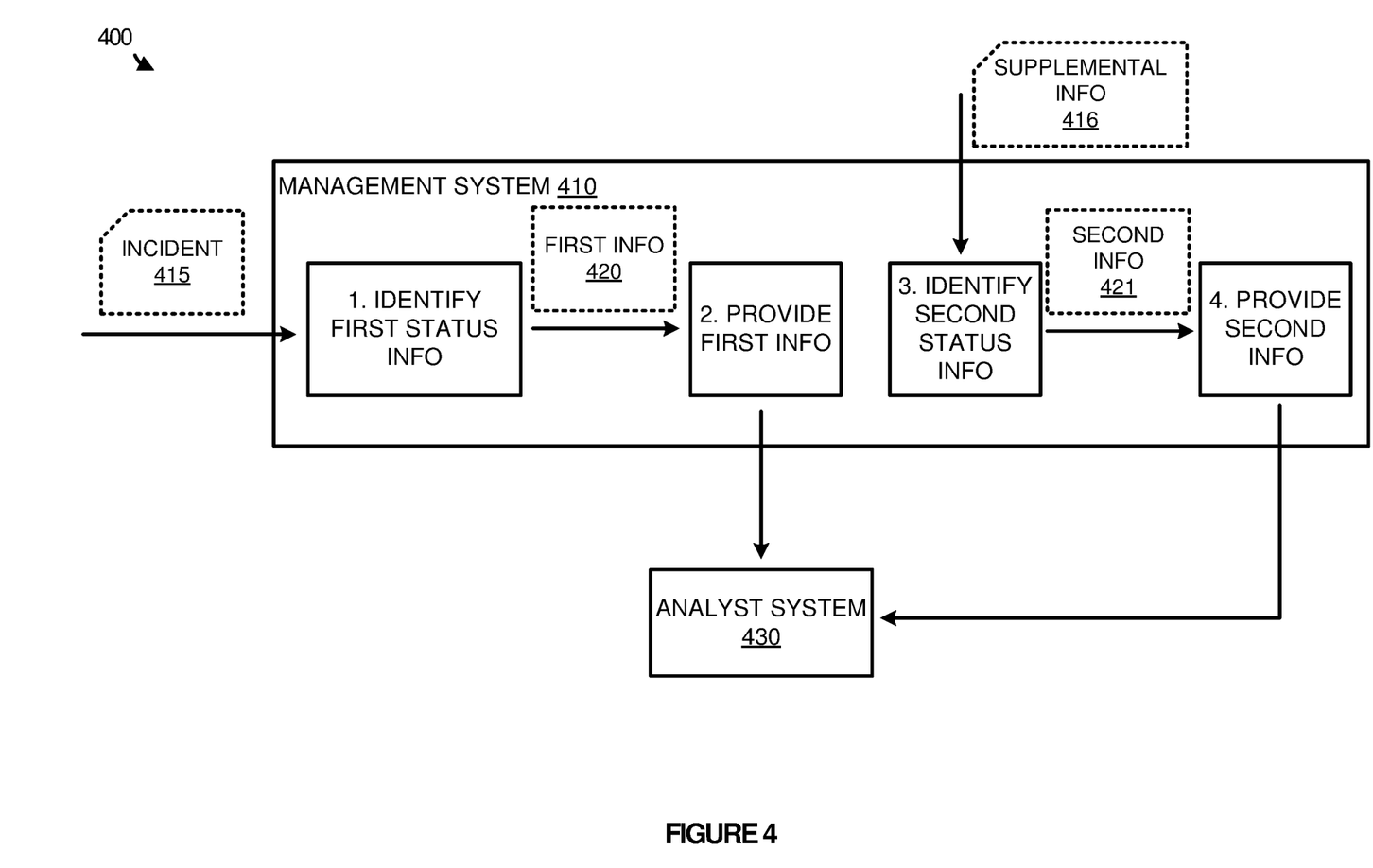
FIG. 4 illustrates an overview of providing status information to an analyst according to an example.

FIG. 4 illustrates an overview 400 of providing status information to an analyst according to an example. Overview 400 includes incident 415, analyst system 430, and management system 410. Management system 410 further includes operations to generate first information 420 a second information 421.

As described herein, a management system 410 may identify incidents within an organization's IT environment. When an incident is identified, management system 410, at step 1, identifies first status information for the incident, wherein the status information may be obtained directly from attributes of the incident (e.g. IP addresses associated with incident, asset identifiers for assets involved in the incident, processes involved in the incident, or some other similar information). Additionally, supplemental information may be used in generating the status information, including information from one or more databases or websites that may include information about the incident, information gathered from action responses to the same or similar incidents in the environment, or some other similar supplemental information for the incident. In some examples, the first information that is supplied to analyst system 430 may include summary information based on attributes obtained directly from the incident, as well as the supplemental information. Further, management system 410 may identify recommended actions to be provided to the responding analyst. These actions may be scored based on the similarity of the incident used against, the successfulness of the action, the quantity of times that the action was implemented, or some other similar factor, including combinations thereof. Thus, the analyst for analyst system 430 may use the summary information and the suggested actions, which are provided as the first status information, at step 2, to generate a response to the incident. In some implementations, when the action suggestions are provided to the analyst system, the suggestions may be provided with data that permits an analyst to select an action that triggers the implementation of the action in the IT environment.

Once the first status information is provided by management system 410, management system 410 may identify, at step 3, second status information, for the incident based on the dynamic changes of the incident as well as changes for other similar incidents. For example, incident 415 may change its state (e.g. from an infiltration state to execute on a computing asset to an exfiltration state to remove data from the computing asset), the incident may be present on another computing asset (e.g. more critical asset), or provide any other changes for the incident. Additionally, other information may be identified for the incident based on actions taken against the same or similar incidents. In particular, management system 410 may identify actions that were taken against the same or similar incidents, the analysts that responded to the incident, the effectiveness of the action or actions against the incident, or any other similar information. From all of the additional information, represented in FIG. 4 as supplemental information 416, management system 410 may identify one or more different actions that can be supplied to analyst system 430, a reorganization of the actions to be taken against the incident, different suggestions of analysts, or any other similar information to be supplied to responding analyst. Once second information 421 is identified, the second information is provided to analyst system 430.

Figure 5:
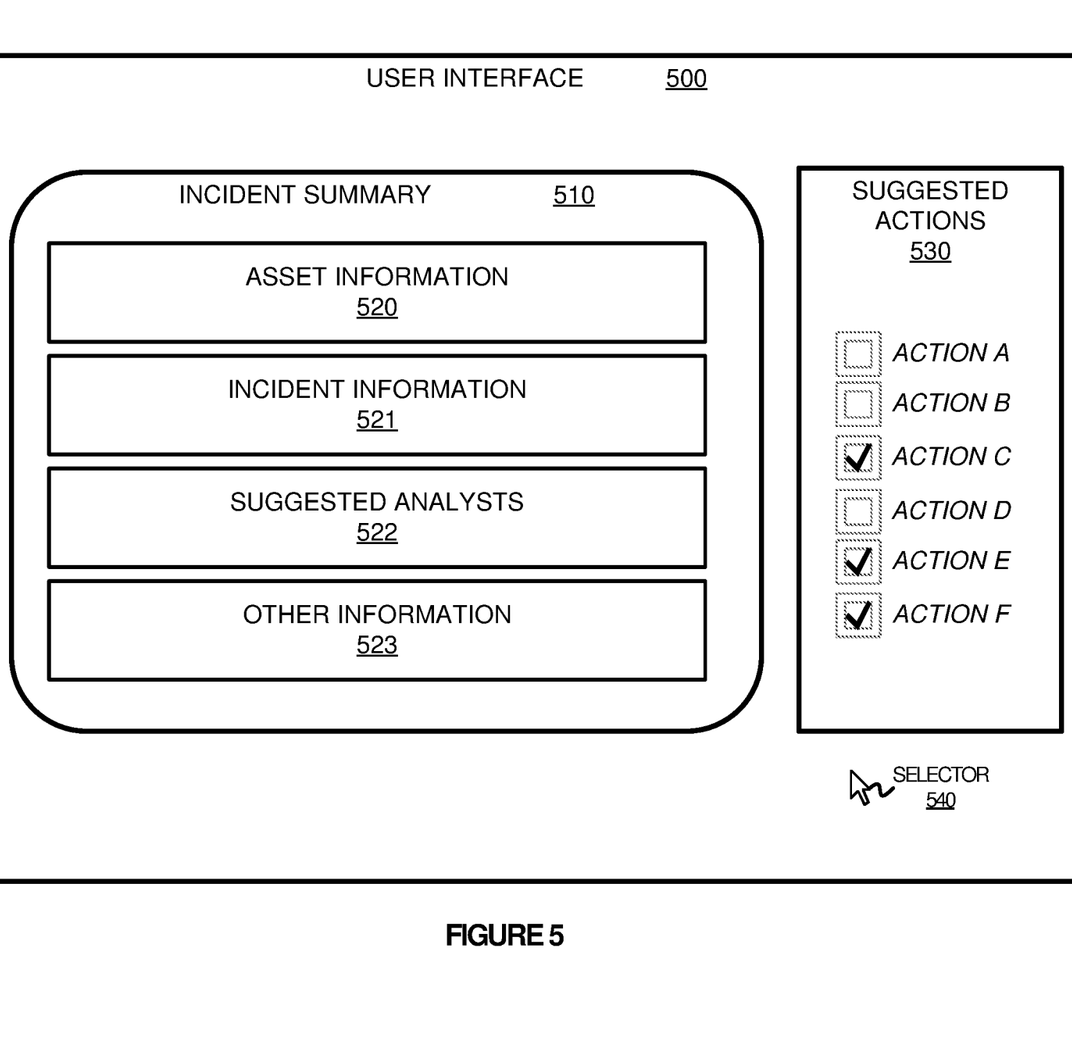
FIG. 5 illustrates a user interface to respond to an incident according to an example.

FIG. 5 illustrates a user interface 500 to respond to an incident according to an example. User interface 500 is used to provide incident status information to an analyst of an IT environment. User interface includes incident summary 510 and suggested actions 530. Incident summary 510 further includes asset information 520, incident information 521, suggested analysts 522, and other information 523.

As described herein, when an incident is identified by a management system, the management system identifies first status information for the incident. This information includes information about the asset(s) affected, information about the incident itself, information about related incidents, or some other similar information. Additionally, the management system may identify suggestions for how to handle the incident including actions that can be taken for the incident and analysts that may be helpful in responding to the incident. In some implementations, the actions may be determined based on actions against the same or similar incidents by analysts of the IT environment. In some implementations, the suggested analysts may comprise analysts that responded to the same or similar incidents for the IT environment.

Once the status information is identified for the incident, the management system may generate user interface 500 to present the information to the analyst responding to the incident. In the example of user interface 500, the analyst is provided with information about the asset, information about the incident presented, suggested analysts to assist in resolving the incident, and any other information related to the incident. Additionally, the analyst is provided with suggested actions 530, which can provide examples of how to respond to the incident. In some implementations, the actions and/or the analysts that are provided to the responding analyst may be promoted based on scores that are provided each of the actions and/or the analysts. In determining the score for an action, the management system may identify the success of previous actions against the same or similar incidents, the amount of times that an action was used against the same or similar incidents, review of other analysts for the action against a certain type of incident, or some other similar information about the action. In determining the score for a suggested analyst, the management system may consider the types of incidents responded to by the analyst, the current activity level of the analyst, the successfulness of the actions by an analyst, or some other similar information for an analyst. Once the scores are generated, the scores may be used to promote actions or analysts over other actions or analysts.

In some implementations, the status information provided to an analyst may be dynamic and change based on state information for the incident within the environment. This status information may be obtained directly from the incident and/or asset affect by the incident, and may also be identified from other sources, such as actions against the same or similar incidents within the environment, the analysts that are currently active in responding to the incidents, any changes in state of the incident, or some other similar state information for the incident. As an example, one or more other analysts may employ actions against other similar incidents within the IT environment. As a result, the management system may identify the actions that were implemented and update the action recommendations for the incident.

In some implementations, when the action or analyst recommendation information is provided to the responding analyst reasons for recommending the action or analyst may be provided to the user. For example, if multiple analysts implemented the same action, then the management system may generate natural language (using predefined formats, algorithms, or some other similar natural language generation mechanism) or some other alert to indicate the actions that were generated and which of the analysts generated the particular action. Further, in some implementations, when information is provided to the analyst, the management system may use natural language to provide a summary of the attributes of the incident, as well as use natural language to summarize information about actions taken by other analysts. Thus, if an analyst took multiple operations to block a particular internet protocol address, the management system may identify a summary of all of the operations (block IP address) and provide incident summary information to the user indicating the action that was taken.

Figure 6:
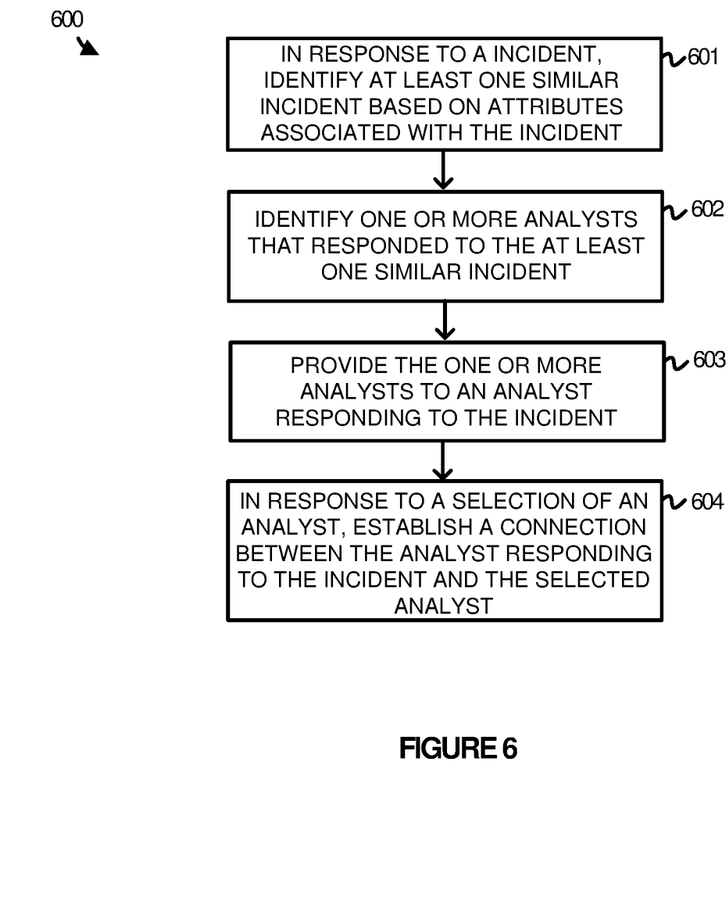
FIG. 6 illustrates an operation of recommending collaboration among security analysts according to an example.

FIG. 6 illustrates an operation 600 of recommending collaboration among security analysts according to an example. The processes of operation 600 are described parenthetically in the paragraphs that follow and may be implemented by management system 120 of FIG. 1.

As described herein, a management system 120 may provide status information to an analyst that is responding to an incident, wherein the status information may include a summary of the incident, as well as suggestions for actions and analysts that may aid in responding to the incident. In some implementations, in response to an incident, the management system 120 may identify (601) at least one similar incident based on attributes associated with the incident. As an example, the management system 120 may identify an incident that is providing a denial of service to a server in an IT environment. Once identified, the management system 120 may compare the attributes of the incident to attributes of other incidents (e.g. IP addresses associated with the incident, domains associated with the incident, and the like) and the type of incident presented. In some implementations, the management system 120 may score previously identified incidents based on their similarity to the current incident, and when the score meets criteria, such as similar IP addresses, data targets, and the like, the management system 120 may identify the incidents as similar.

After the similar incidents are identified, the management system 120 identifies (602) one or more analysts that responded to the similar incidents and provides (603) the one or more analysts to an analyst responding to the incident. In some examples, the analysts that are provided to the responding analyst may be prioritized or presented in a hierarchy to the currently responding analyst. In prioritizing the analysts to be presented, the management system 120 may score each of the analysts. These scores may be based on the successfulness rating of actions by each of the analysts, the quantity of similar incidents responded to by the analyst, the most recent activity of the analyst, or some other similar information about the analyst. Once the scores are determined, the management system 120 may prioritize the analysts for presentation to the currently responding analyst. This presentation may include a list with the highest scoring analyst first in the list, bolding or highlighting analysts with the highest scores, or some other similar presentation to promote analysts over other analysts. Further, as is described earlier in the application, the management system may monitor and modify the score based on changes in the IT environment. Thus, although a first set of analysts are determined when the incident is first identified, the management system may provide a different set of analysts to the responding analyst at a later time.

Once suggested analysts are provided to the analyst responding to the incident, the analyst may select an analyst to collaborate in responding to the incident. In particular, the incident management system may identify the request via a button, a drop-down menu, or some other similar user interface elements, and in response to the request, establish (604) a connection between the analyst responding to the incident and the selected analyst. This connection may be a direct connection (e.g. peer-to-peer) or may be facilitated through the management system. The connection may permit the analysts to share text communications, files, video communications, or some other similar communication among the analysts. Additionally, once a first connection is established, the analysts may further request and involve other users in responding to the incident.

Figure 7:
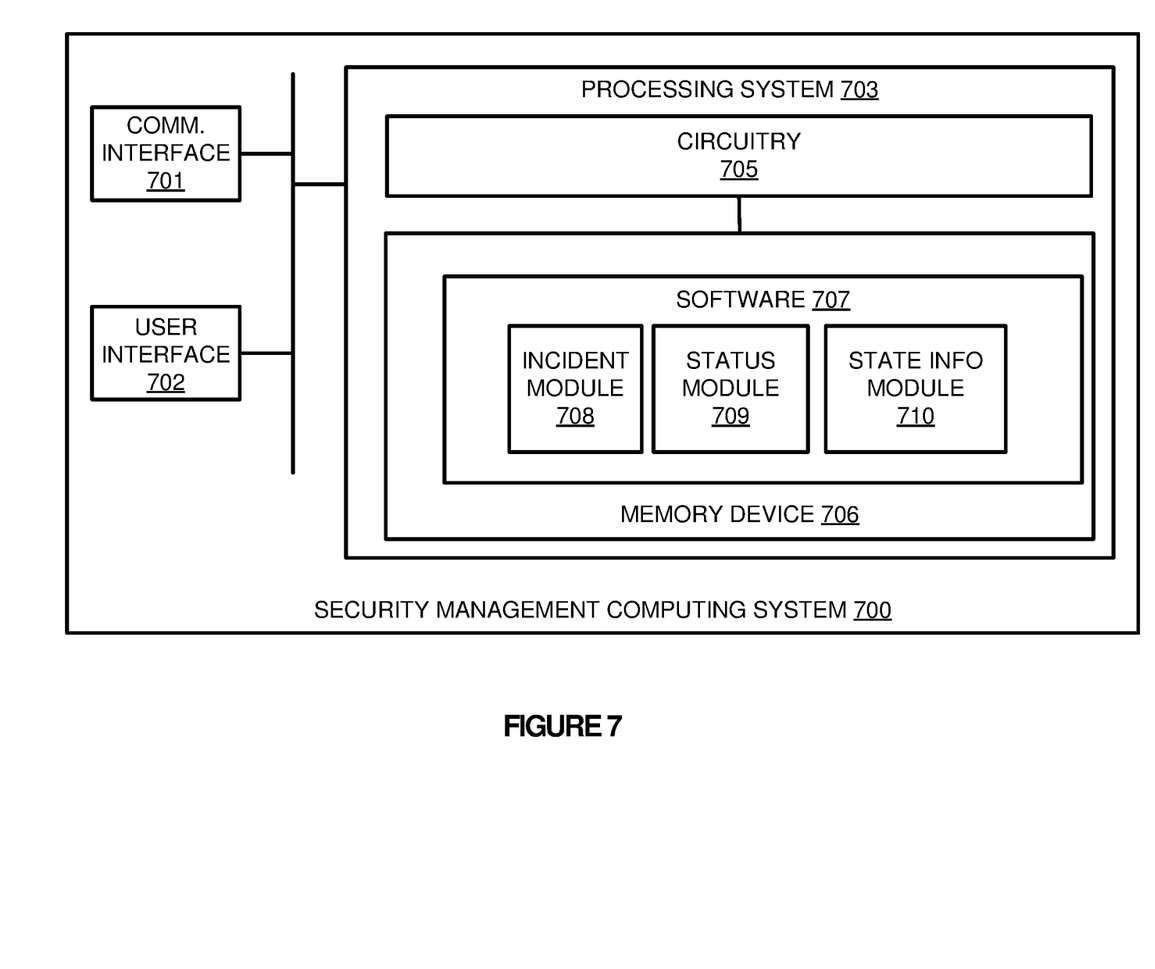
FIG. 7 illustrates a security management computing system according to an example.

FIG. 7 illustrates a security management computing system 700 according to an example. Computing system 700 is representative of any computing system or systems with which the various operational architectures, processes, scenarios, and sequences disclosed herein for a management system 120 may be implemented. Computing system 700 is an example of management system 120, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In at least one implementation, communication interface 701 may be used to communicate analyst consoles or systems as well as computing assets within an organization's IT environment.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes incident module 708, status module 709, and state information module 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In at least one implementation, incident module 708 directs processing system 703 to identify incidents for assets within an organization's computing network. In response to an incident, status module 709 may identify at least one analyst to support a response to the incident and provide the at least one analyst with a first status information for the incident. In particular, the first status information may identify attributes for the incident (e.g. IP addresses related to the incident, asset identifiers for the incident, or any other similar information for the incident), may further identify supplementary information obtained from websites and/or databases, may include suggested analyst determined based on the attributes and the supplementary information, and/or may include suggested actions to be taken against the incident derived from the attributes, the supplementary information, and, in some examples, actions against similar incidents in the environment.

In addition to providing the initial status of the incident to the responding analyst, state information module 710 is further configured to monitor the state of the incident within the IT environment and determine an updated state for the incident. In some implementations, state information module 710 may monitor the state of the current incident, as well as the state of other similar incidents within the environment. The state information module may identify actions that are taken against the same or similar incidents and determine how successful each of the actions were against their corresponding incident. Once the information is identified, status module 709 may generate an updated status for the incident, wherein the updated status may update the action recommendations and/or analysts that are recommended to the responding user. Once the updated status is identified, status module 709 may direct processing system 703 to provide the updated status to the responding analyst.

In some implementations, when the analysts and action recommendations are provided to a responding analyst, the actions may be prioritized based on scores allocated to each analyst and/or action recommendation. For example, analysts may be scored based on the successfulness in responding to incidents (e.g. blocking or removing the incident), the amount of activity they are currently providing in responding to incidents, the number of incidents of similar type that have been respond, the familiarity with the affected asset, or some other similar information. Once the score is identified for each of the analysts, the analysts may be prioritized based on the scores and provided to the responding analyst. Similarly, the available action recommendations may be scored based on the successfulness of the action against the incident, the quantity of actions that were used, any reviews of analysts about the action, or some other similar factor. Once scored, the actions may be provided to the responding analyst, wherein actions may be promoted over other actions based on their score. Additionally, as described herein the scores for each of the actions may be dynamic based on the state information that is monitored within the IT environment. Thus, although a first score may be identified for an incident, it should be understood that the score may change based on observations within the IT environment.

In some examples, in providing the status information to a responding analyst, at least a portion of the information may be provided as natural language to the analyst. For example, if another analyst implemented variety of operations to block a specific IP address, security management computing system 700 may identify the end result of the incident (block IP) and provide information about the action to a currently responding analyst. In some implementations, in providing information about a particular action, security management computing system 700 may provide information about the type of action that was implemented, the analyst that implemented the action, and the asset that the action was implemented in. This may provide the currently responding analyst information about what action was taken, where the action was taken, and who initiated the action.

Figure 8:
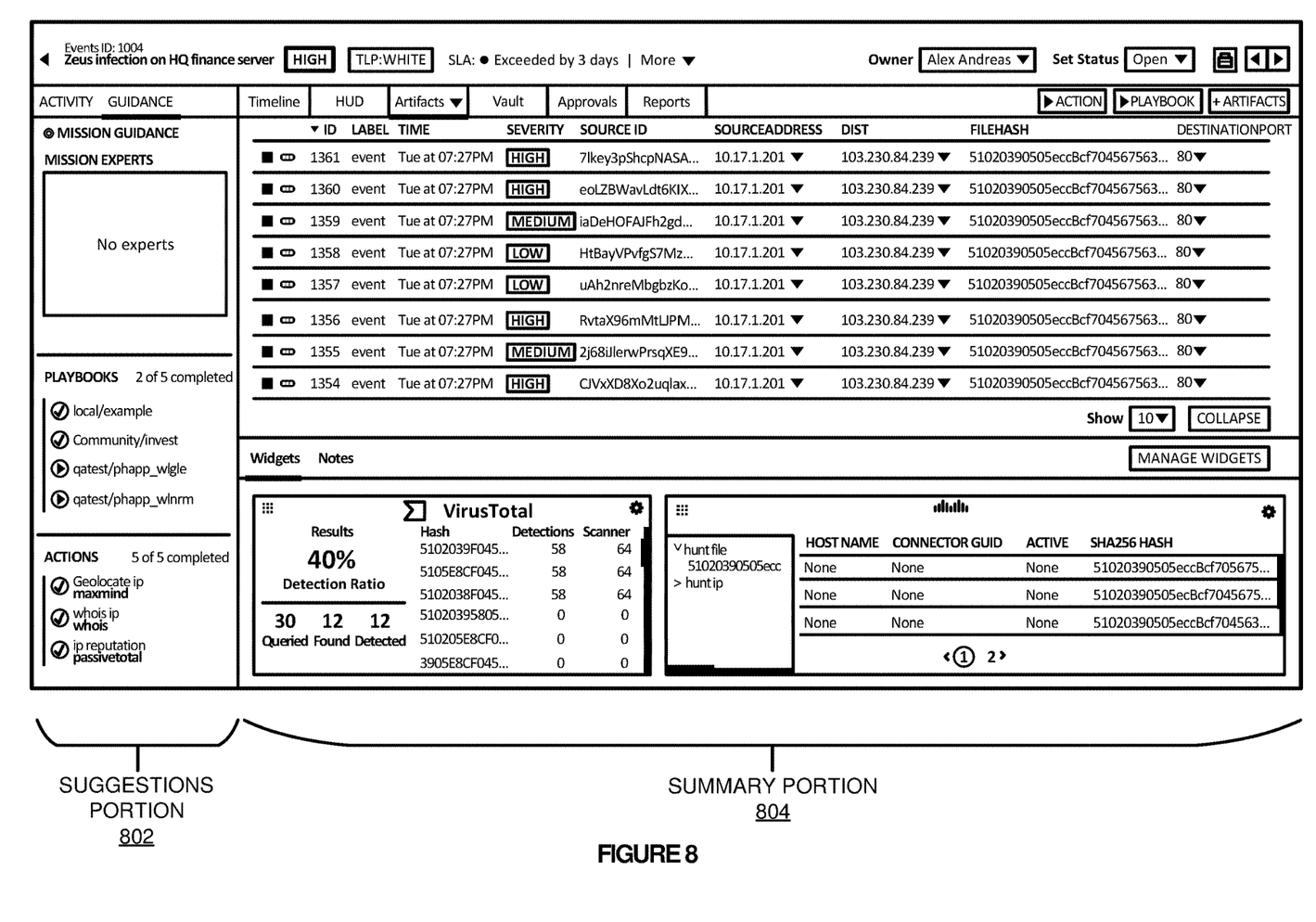
FIG. 8 illustrates a user interface for an analyst according to an example.

FIG. 8 illustrates a user interface 800 for an analyst according to an example. User interface 800 includes suggestions portion 802, and summary portion 804 for an incident identified in an IT environment. Specifically, summary portion 804 is used to provide attribute information for the incident, wherein the information may be derived from the asset itself (e.g. communication log information, IP addresses, asset identifiers, and the like), as well as information from one or more databases or websites (e.g. geographic location for an IP address, the reputation of a domain, or some other similar information). Additionally, suggestions portion 802 includes information about other analysts and the actions that the other analysts are implementing against similar incidents in the IT environment. In the example of user interface 800, information is provided about other actions or sets of actions (referred to as "playbooks") implemented by other analysts, and also provides a portion for "mission experts" or analysts that have expertise regarding the particular incident type. These analysts may be identified from the quantity of incidents that have been processed, the success rate in processing the incidents, or some other similar factor.

Further, as described herein, once an incident is identified in the environment, the status for the incident may be updated based on state information monitored from the IT environment. In some implementations, monitoring the state information may include monitoring which analysts are implementing actions, what types of actions are being implemented, the results of the actions, or some other similar information in the environment. Additionally, the incident itself may be monitored to identify any assets that are involved with the incident, any changes in state of the incident, or any other similar information related to the incident to update summary portion 804.

Returning to the elements of FIG. 1, analyst systems 110-116 and management system 120 may each comprise communication interfaces, network interfaces, processing systems, computer systems, microprocessors, storage systems, storage media, or some other processing devices or software systems, and can be distributed among multiple devices. Examples of analyst systems 110-116 and management system 120 can include software such as an operating system, logs, databases, utilities, drivers, networking software, and other software stored on a computer-readable medium. Analyst systems 110-116 and management system 120 may comprise, in some examples, one or more server computing systems, desktop computing systems, laptop computing systems, or any other computing system, including combinations thereof.

Network 130 includes computing assets 140-143, which may include physical computing systems (host computing systems, user devices, and the like), virtual computing systems, such as virtual machines and containers, routers, switches, and other similar digital systems.

Communication among analyst systems 110-116, management system 120, and assets within network 130 may use metal, glass, optical, air, space, or some other material as the transport media. Communication among analyst systems 110-116, management system 120, and assets within network 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication among analyst systems 110-116, management system 120, and assets within network 130 may use direct links or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of dynamically generating status updates for incidents in an information technology (IT) environment, the method comprising:

receiving an indication of an incident within the IT environment;

identifying attributes of the incident from data obtained from the IT environment that is indicative of the incident;

deriving supplementary information for the incident from the attributes of the incident using at least one supplemental resource;

identifying action recommendations for the incident based on at least one of the attributes or the supplementary information;

determining a first status for the incident, wherein the first status for the incident corresponds to a first state of a cyberattack, wherein the first state of the cyberattack is identified based on a first type of activity associated with the incident, and wherein the first status indicates the action recommendations;

causing display of the first status;

monitoring state information associated with the incident in the IT environment, wherein the state information indicates a second type of activity associated with the incident, wherein the second type of activity is associated with a second state of the cyberattack;

determining a second status for the incident based on the state information, wherein the second status for the incident corresponds to the second state of the cyberattack; and causing display of the second status and an alert indicating how other analysts are responding to the incident.

2. The method of claim 1, further comprising determining, using one or more factors, scores for one or more of the action recommendations, wherein the one or more factors comprise a source of the incident, a type of the incident, a type of asset affected by the incident, actions taken against similar incidents, or a combination thereof.

3. The method of claim 1, wherein determining the first status for the incident comprises:
identifying one or more analysts to respond to the incident based on activity scores for the one or more analysts;
wherein the first status indicates the one or more analysts.

4. The method of claim 1, wherein monitoring the state information associated with the incident comprises identifying similar incidents within the IT environment and identifying actions implemented against the similar incidents.

5. The method of claim 1, wherein monitoring the state information associated with the incident comprises identifying similar incidents within the IT environment, and identifying actions implemented against the similar incidents, and wherein the second status indicates additional action recommendations identified based on the identified actions.

6. The method of claim 1, wherein monitoring the state information associated with the incident comprises:
identifying similar incidents within the IT environment;
identifying actions implemented against the similar incidents; and
identifying one or more analysts that implemented the actions against the similar incidents.

7. The method of claim 1, wherein monitoring the state information associated with the incident comprises:
identifying similar incidents within the IT environment;
identifying actions implemented against the similar incidents;
identifying one or more analysts that implemented the actions against the similar incidents; and
identifying a score for each of the one or more analysts and promoting analysts based at least on the scores for the one or more analysts.

8. The method of claim 1, wherein the at least one supplemental resource comprises at least one of a database or a website.

9. The method of claim 1, wherein monitoring the state information associated with the incident in the IT environment comprises identifying one or more similar incidents within the IT environment and identifying one or more actions implemented against the one or more similar incidents, and wherein determining the second status for the incident based on the monitored state information comprises generating a summary of the one or more actions.

10. The method of claim 1, wherein monitoring the state information associated with the incident in the IT environment comprises identifying one or more similar incidents within the IT environment and identifying one or more actions implemented against the one or more similar incidents, and wherein determining the second status for the incident based on the monitored state information comprises generating a summary of the one or more actions, wherein the summary indicates one or more analysts that implemented the one or more actions.

11. The method of claim 1:
wherein monitoring the state information associated with the incident in the IT environment comprises identifying one or more similar incidents within the IT environment and identifying one or more actions implemented against the one or more similar incidents;
wherein determining the second status for the incident based on the monitored state information comprises generating a summary of the one or more actions, wherein the summary indicates one or more analysts that implemented the one or more actions; and
the method further comprising receiving a request to generate a communication session with at least one analyst of the one or more analysts and initiating a communication session between an analyst associated with the request and the at least one analyst.

12. The method of claim 1:
monitoring the state information associated with the incident in the IT environment comprises identifying one or more similar incidents within the IT environment and identifying one or more actions implemented against the one or more similar incidents;
wherein determining the second status for the incident based on the monitored state information comprises generating a summary of the one or more actions, wherein the summary indicates one or more analysts that implemented the one or more actions; and
wherein the summary indicates an effectiveness of the one or more actions.

13. The method of claim 1:
wherein monitoring the state information associated with the incident in the IT environment comprises identifying one or more similar incidents within the IT environment and identifying one or more actions implemented against the one or more similar incidents;
wherein determining the second status for the incident based on the monitored state information comprises generating a summary of the one or more actions, wherein the summary indicates one or more analysts that implemented the one or more actions; and
wherein the summary indicates one or more assets on which the one or more actions were implemented.

14. The method of claim 1 further comprising:
determining a third status of the incident based on the monitored state information, wherein the third status for the incident corresponds to a third state of the cyberattack, and wherein the third state of the cyberattack is identified based on a third type of activity associated with the incident; and causing display of the third status.

15. An apparatus comprising:

one or more non-transitory computer readable storage media;

a processing system operatively coupled to the one or more non-transitory computer readable storage media; and program instructions stored on the one or more non-transitory computer readable storage media that, when read and executed by the processing system, direct the processing system to at least:

identify an incident within an information technology (IT) environment;

identify attributes of the incident from data obtained from the IT environment that is indicative of the incident;

derive supplementary information for the incident from the attributes of the incident using at least one supplemental resource;

identify action recommendations for the incident based on at least one of the attributes or the supplementary information;

determine a first status for the incident, wherein the first status for the incident corresponds to a first state of a cyberattack, wherein the first state of the cyberattack is identified based on a first type of activity associated with the incident, and wherein the first status indicates the action recommendations;

cause display of the first status;

monitor state information associated with the incident in the IT environment, wherein the state information indicates a second type of activity associated with the incident, wherein the second type of activity is associated with a second state of the cyberattack;

determine a second status for the incident based on the state information, wherein the second status for the incident corresponds to a second stage of the cyberattack; and cause display of the second status and an alert indicating how other analysts are responding to the incident.

16. The apparatus of claim 15, wherein the program instructions further direct the processing system to determine, using one or more factors, scores for one or more of the action recommendations, and wherein the one or more factors comprise a source of the incident, a type of the incident, a type of asset affected by the incident, actions taken against similar incidents, or a combination thereof.

17. The apparatus of claim 15, wherein determining the first status for the incident comprises:

identifying one or more analysts to respond to the incident based on activity scores for the one or more analysts;

wherein the first status indicates the one or more analysts.

18. The apparatus of claim 15, wherein monitoring the state information associated with the incident comprises identifying similar incidents within the IT environment and identifying actions implemented against the similar incidents.

19. The apparatus of claim 15, wherein monitoring the state information associated with the incident comprises identifying similar incidents within the IT environment, and identifying actions implemented against the similar incidents, and wherein the second status indicates additional action recommendations identified based on the identified actions.

20. The apparatus of claim 15:

wherein monitoring the state information associated with the incident in the IT environment comprises identifying one or more similar incidents within the IT environment and identifying one or more actions implemented against the one or more similar incidents;

wherein determining the second status for the incident based on the monitored state information comprises generating a summary of the one or more actions, wherein the summary indicates one or more analysts that implemented the one or more actions; and wherein the program instructions further direct the processing system to receive a request to generate a communication session with at least one analyst of the one or more analysts and initiate a communication session between an analyst associated with the request and the at least one analyst.

21. The apparatus of claim 15:

wherein monitoring the state information associated with the incident in the IT environment comprises identifying one or more similar incidents within the IT environment and identifying one or more actions implemented against the one or more similar incidents;

wherein determining the second status for the incident based on the monitored state information comprises generating a summary of the one or more actions, wherein the summary indicates one or more analysts that implemented the one or more actions; and wherein the summary indicates an effectiveness of the one or more actions.

22. The apparatus of claim 15, wherein the at least one supplemental resource comprises at least one of a database or a website.

23. An apparatus comprising:

one or more non-transitory computer readable storage media; and program instructions stored on the one or more non-transitory computer readable storage media that, when read and executed by a processing system, direct the processing system to at least:

receive an indication of an incident within an information technology (IT) environment;

identify attributes of the incident from data obtained from the IT environment that is indicative of the incident;

derive supplementary information for the incident from the attributes of the incident using at least one supplemental resource;

identify action recommendations for the incident based on at least one of the attributes or the supplementary information;

determine a first status for the incident, wherein the first status for the incident corresponds to a first state of a cyberattack, wherein the first state of the cyberattack is identified based on a first type of activity associated with the incident, and wherein the first status indicates the action recommendations;

cause display of the first status;

monitor state information associated with the incident within the IT environment, wherein the state information indicates a second type of activity associated with the incident, wherein the second type of activity is associated with a second state of the cyberattack;

identify one or more similar incidents within the IT environment;

identify one or more actions implemented against the one or more similar incidents;

generate a summary of the one or more actions, wherein the summary indicates one or more analysts that implemented the one or more actions; and cause display of a second status indicating the summary of the one or more actions and an alert indicating how other analysts are responding to the incident.

24. The apparatus of claim 23, wherein the summary further indicates the one or more actions.

25. The apparatus of claim 23, wherein the summary further indicates an effectiveness of each of the one or more actions.

26. The apparatus of claim 23, wherein the at least one supplemental resource comprises at least one of a database or a website.

27. The apparatus of claim 23, wherein the program instructions further direct the processing system to receive a request to generate a communication session with at least one analyst of the one or more analysts, and to initiate a communication session between an analyst that generated the request and the at least one analyst.

28. The apparatus of claim 23, wherein identifying the one or more similar incidents within the IT environment comprises identifying the one or more similar incidents based on an incident type for the incident.

29. The apparatus of claim 23, wherein the program instructions further direct the processing system to determine, using one or more factors, scores for one or more of the action recommendations, and wherein the one or more factors comprise a source of the incident, a type of the incident, a type of asset affected by the incident, actions taken against similar incidents, or a combination thereof.

30. The apparatus of claim 23, wherein generating the summary of the one or more actions comprises generating a natural language summary of the one or more actions.

* * * * *